J. H. BRINTON.
Wheel Cultivator.
No. 84,935.
2 Sheets—Sheet 1.
Patented Dec. 15, 1868.
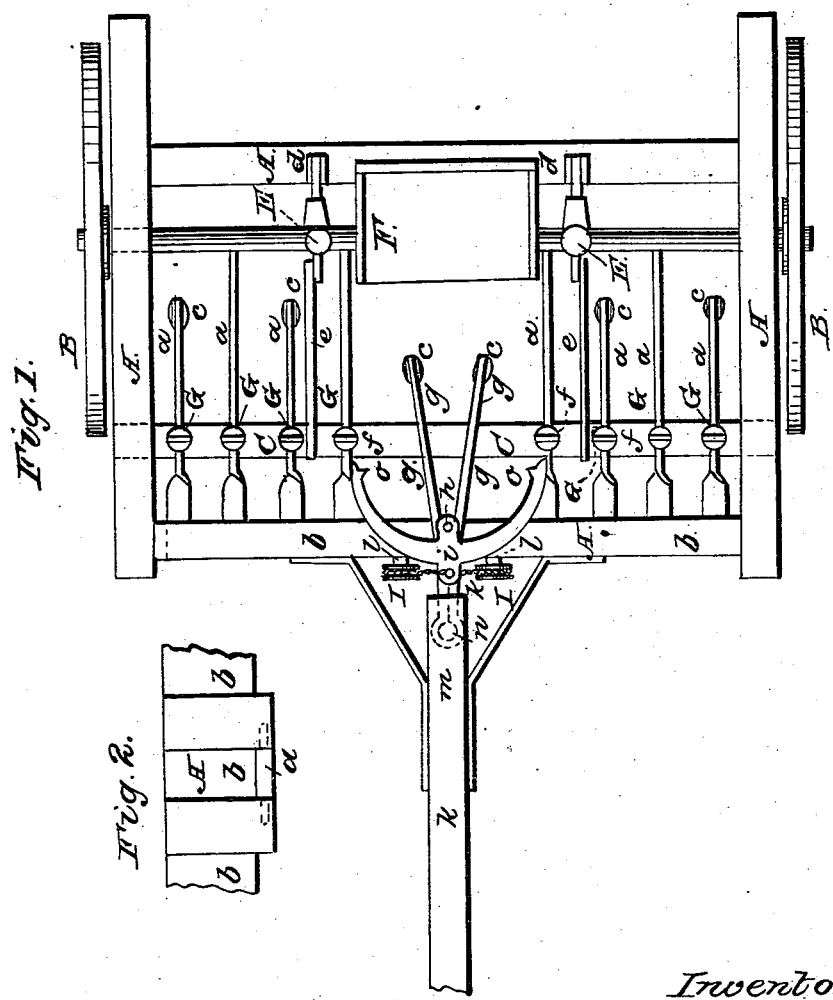

J. H. BRINTON.
Wheel Cultivator.
No. 84,935.
2 Sheets—Sheet 2.
Patented Dec. 15, 1868.
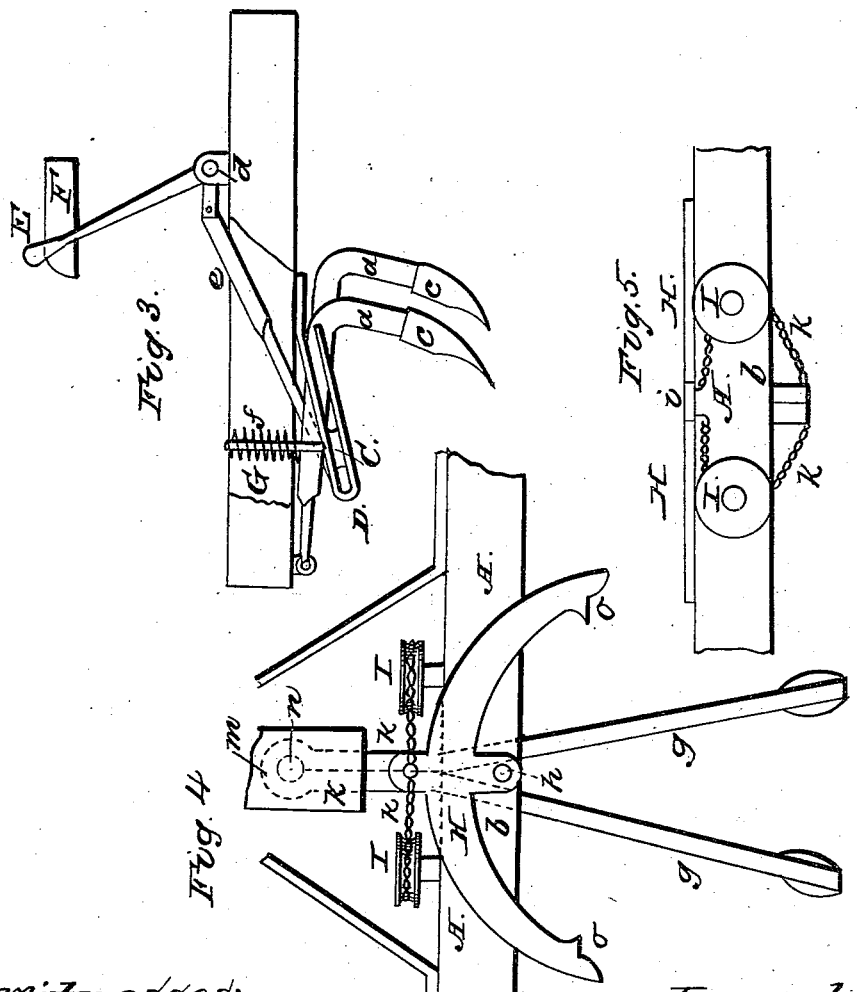
Witnesses:
Ambrose Haskins Jr
William C. Bodin
Inventor:
Joseph H. Brinton
per Francis D. Pastorius
Attorney

UNITED STATES PATENT OFFICE.

JOSEPH H. BRINTON, OF THORNBURY TOWNSHIP, PENNSYLVANIA.

Letters Patent No. 84,935, dated December 15, 1868.

IMPROVEMENT IN CULTIVATORS.

The Schedule referred to in these Letters Patent and making part of the same.

*To all whom it may concern:*

Be it known that I, JOSEPH H. BRINTON, of Thornbury township, Chester county, Pennsylvania, have invented a new and improved Cultivator; and I do hereby declare that the following is a full, clear, and exact description of the same, reference being had to the accompanying sheets of drawings, and to the letters of reference marked thereon.

The object of this invention is to simplify the management of cultivators, and increase their efficiency, which is effected by adapting the principle of steerage for governing the plows working adjacent to or straddling a hoed crop, for the purpose of keeping them at regulated distances from the row, thereby correcting any irregularity in the movement of the horses The person operating has the power of guiding the said plows with his feet, with the greatest nicety. While thoroughly cultivating the soil, and tearing up the weeds, he can prevent the slightest injury being done to the crop, the steerage being independent of the horses, and so simple that any one may control it with the greatest ease.

It is also effected by the management of the plows of the same cultivator which work between the rows, for cultivating the soil, removing weeds, &c.

The attendant, by means of double levers, which connect with a transverse adjusting-bar, moving in inclined slots or openings at the sides of the implement, is enabled to regulate the depth the plows enter the soil, or put a temporary pressure on them when they meet with obstructions from the hardness of the ground.

The levers or arms, to which the plows are attached, are, in a measure, self-regulating, each swinging by an ordinary hinge, and having a spiral-spring pressure, or its equivalent, to press the plow of each into the soil.

On reference to the accompanying sheets of drawings, making part of this specification—

Figure 1 is a plan view.

Figure 2 shows the method of hinging the levers or arms carrying the plows to the front of the implement.

Figure 3 is a side view of the implement, showing the inclined slots, the transverse adjusting-bar, and the spiral spring on one of the plow-levers. The side-bar of the framing and the wheel on that side are, in part, sectioned, to show the arrangement of the aforesaid parts.

Figure 4 is a plan view of the steering-apparatus, and

Figure 5 is a front view of the same.

Similar letters refer to similar parts in the several views.

A is the frame of the cultivator, mounted on a suitable pair of wheels, B.

$a$ $a$, &c., are levers or arms, each of which swings, by an independent hinge-joint, from the front bar $b$ of the framing, and to which are attached the plows $c$ $c$, &c.

C is an adjusting-bar, placed transversely of the implement, on which the levers $a$ are carried.

Its ends take into and move in the inclines D, fixed to the bottom at each side of the framing.

E E are lever-handles, on both sides of the driver's seat F, two being shown in this instance, though one can be made to answer the end sought.

They have a vertical vibrating motion in the jaws $d$ of the framing.

They connect, by means of the rods $e$ $e$, with the transverse bar C.

It will be readily seen that, as the handles are moved forward, the bar C is moved down the inclines D, by which the plow-levers are gradually lowered, and a greater working depth given to the plows $c$. When the handles are moved in the opposite direction, the bar C is moved up the inclines, which raises the plow-levers, or arms $a$, lifting the plows $c$ either clear of the soil, or adjusting their working depth.

The levers or arms $a$ are, in a measure, self-regulating. Each vibrates on an independent hinge, being capable of working on irregular land, and able to adjust itself to any irregularities, without disturbing the rest of the machine.

Each lever is provided with a spiral spring, G, which is retained in its relative position by means of a yoke, $f$, fixed vertically to the transverse bar C.

The levers $g$ $g$, which carry the independent plows working adjacent to the rows of corn, are guided by the feet of the driver, on the steerage-principle, to correct any irregularity in the movement of the horses, as follows:

H is a lever, formed in an arc of a circle, and vibrates or rocks horizontally on a pin, $h$, in the front bar of the framing.

$i$ is a projection of the said lever, to which are fixed the ends of the chains or cords $k$ $k$, which pass over the pulleys I, turning on the pins $l$ $l$ of the framing.

The other ends of the said chains are fixed to the levers $g$ $g$, which, at this point, are placed side by side, forming an eye, $m$, shown in dotted lines, fig. 1, which takes over a pin, $n$, of the pole K of the machine.

The levers are parallel for a short distance, and then diverge sufficiently to enable the plows to work on both sides of the row.

The ends of the arc are provided with steps $o$, for the feet of the driver.

It will be seen, as the driver presses with his feet, alternately, on the steps $o$, a horizontal rocking motion will be given to the lever H on the pin $h$ that couples it to the front bar of the framing, which motion is imparted to the plows on the levers or arms $g$ $g$ adjacent to the rows, by the mechanism hereinbefore shown, and enables the driver to cultivate close to the row without the slightest injury.

I wish it distinctly understood that I do not confine myself to the slot D, as shown in the accompanying drawings, knowing it to be in the province of any skilled mechanic to devise an incline of different construction, and accomplish the end sought.

I do not confine myself to the mechanism herein shown for preserving the relative position of the plows on the vibrating levers or arms $g$ adjacent to the rows, being the steerage.

I do not confine myself to the spiral spring G, as shown, for keeping the plows in the soil, and permitting them to yield to obstacles; but

What I claim as my invention, and desire to secure by Letters Patent, is—

1. A transverse adjusting-bar, moving in inclined slots, or their equivalents, for the purpose shown.

2. A yielding pressure applied to the arms or levers $a$, together with a transverse bar, moving in inclines, whereby to regulate the depth the plows enter the soil, and to accommodate them to any unevenness of the ground.

In testimony whereof, I hereunto sign my name to this specification, in presence of two subscribing witnesses.

JOSEPH H. BRINTON.

Witnesses:
JOHN H. BAYLESS,
JOHN Q. TAYLOR.